Dec. 1, 1931.  E. W. HOLMES  1,834,900
AUTOMOBILE LIFT
Filed Oct. 7, 1927  8 Sheets-Sheet 1
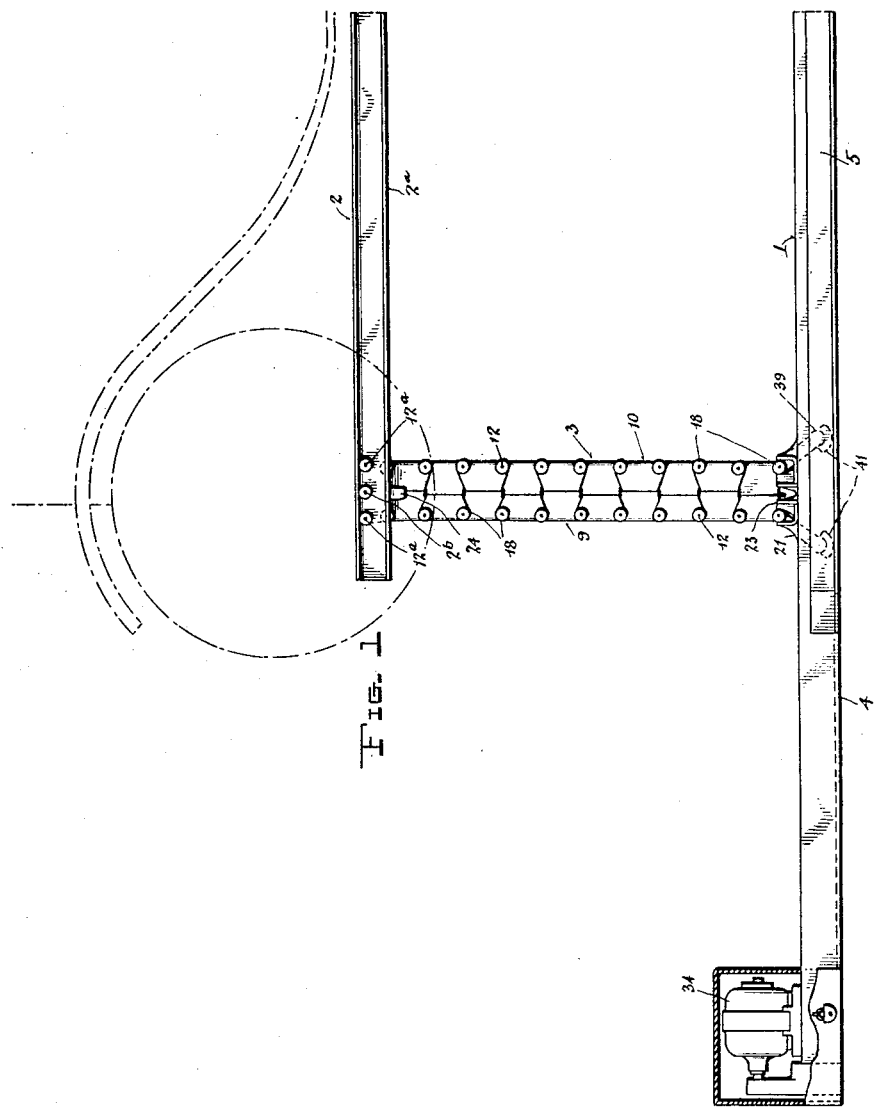
Inventor
Ernest W. Holmes,
By [signature] Attorney

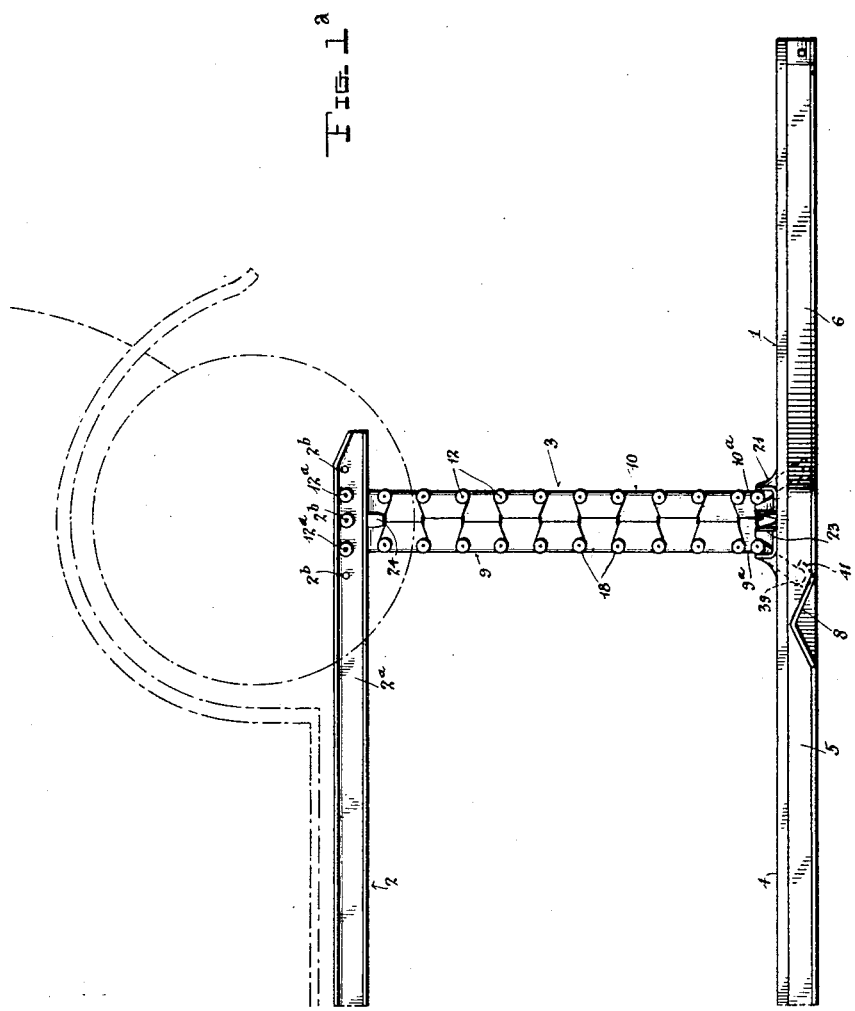

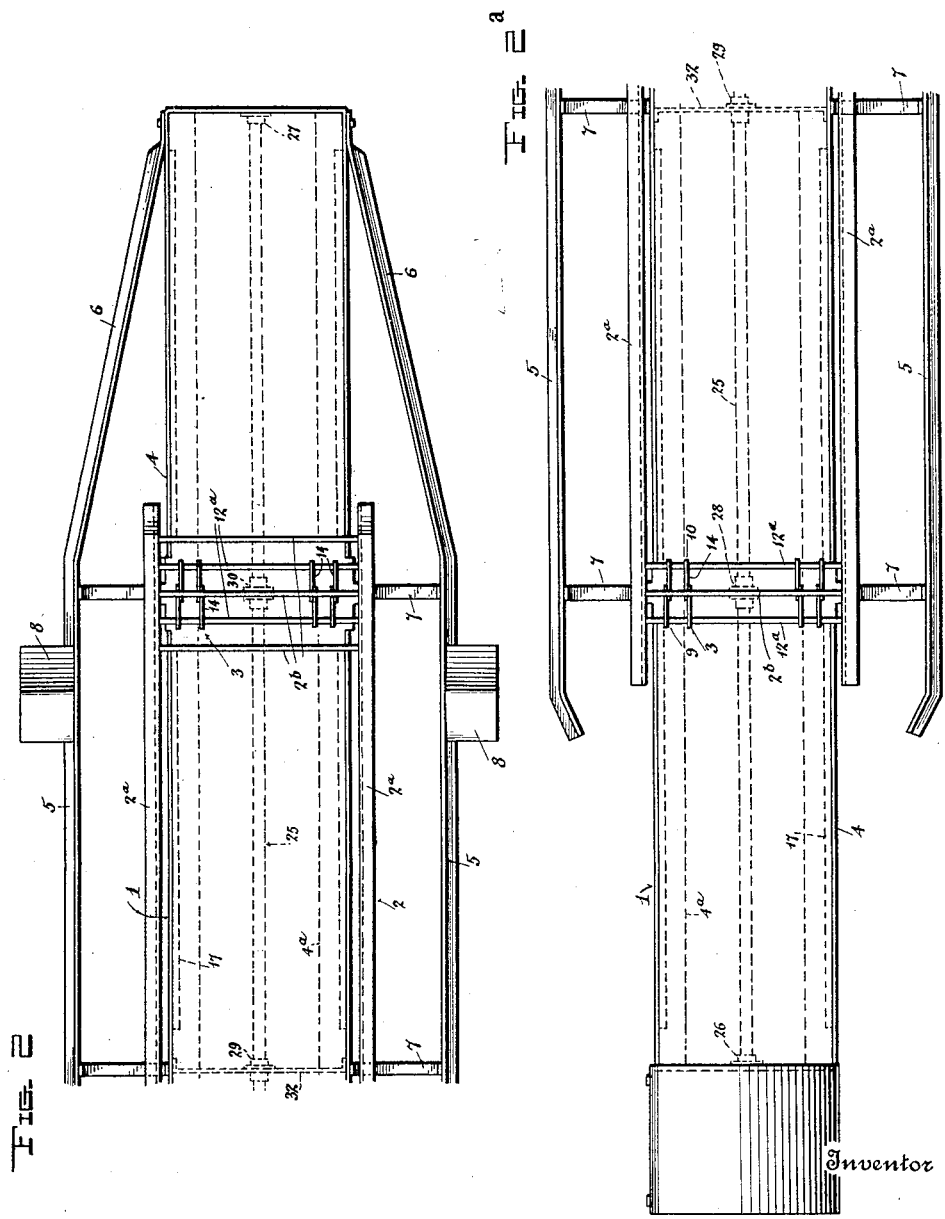

Dec. 1, 1931. E. W. HOLMES 1,834,900
AUTOMOBILE LIFT
Filed Oct. 7, 1927 8 Sheets-Sheet 4
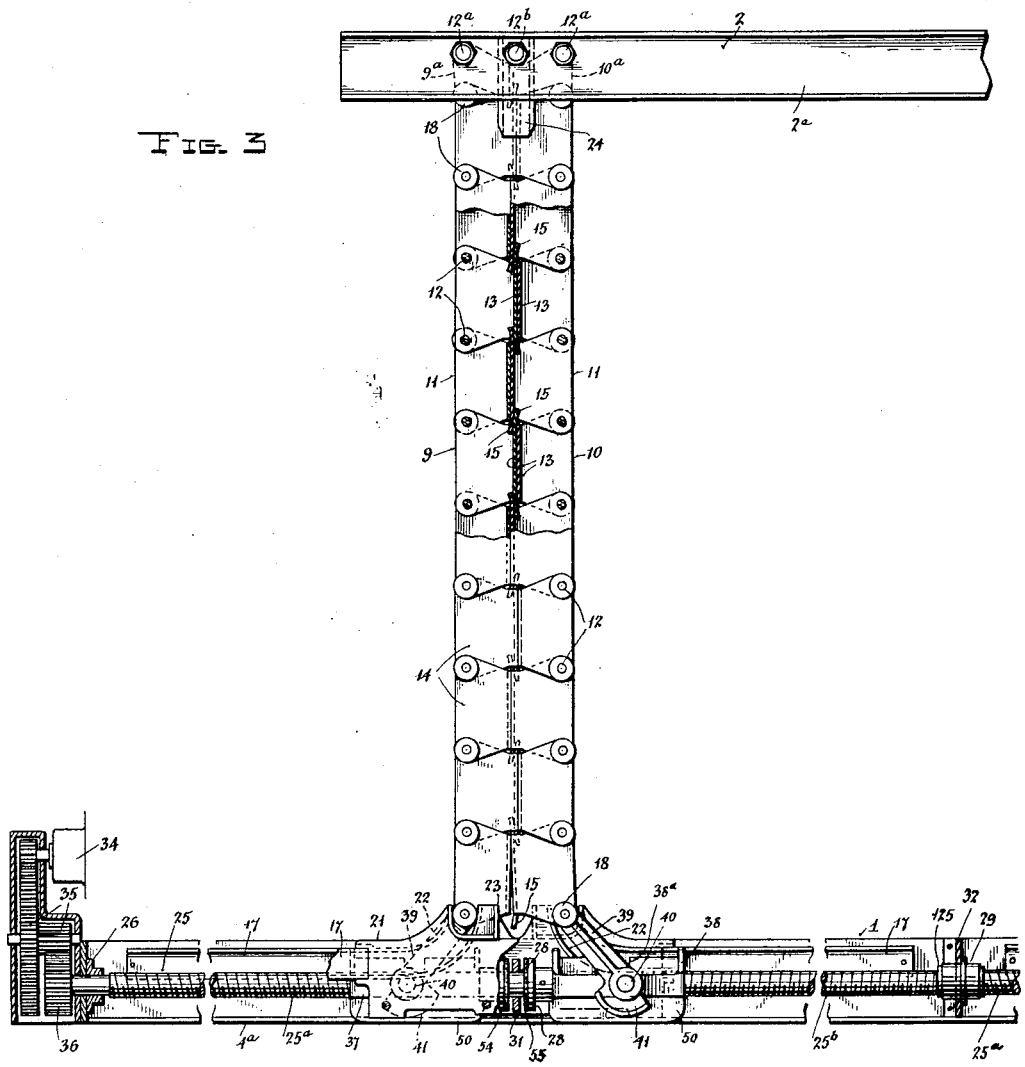
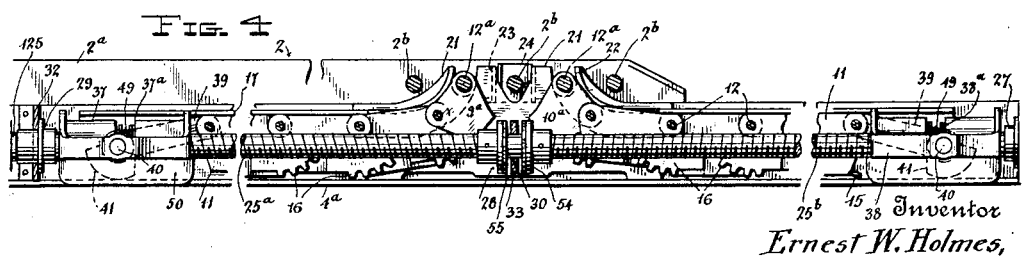
Inventor
Ernest W. Holmes,
By
Attorney Dec. 1, 1931.   E. W. HOLMES   1,834,900
AUTOMOBILE LIFT
Filed Oct. 7, 1927   8 Sheets-Sheet 5
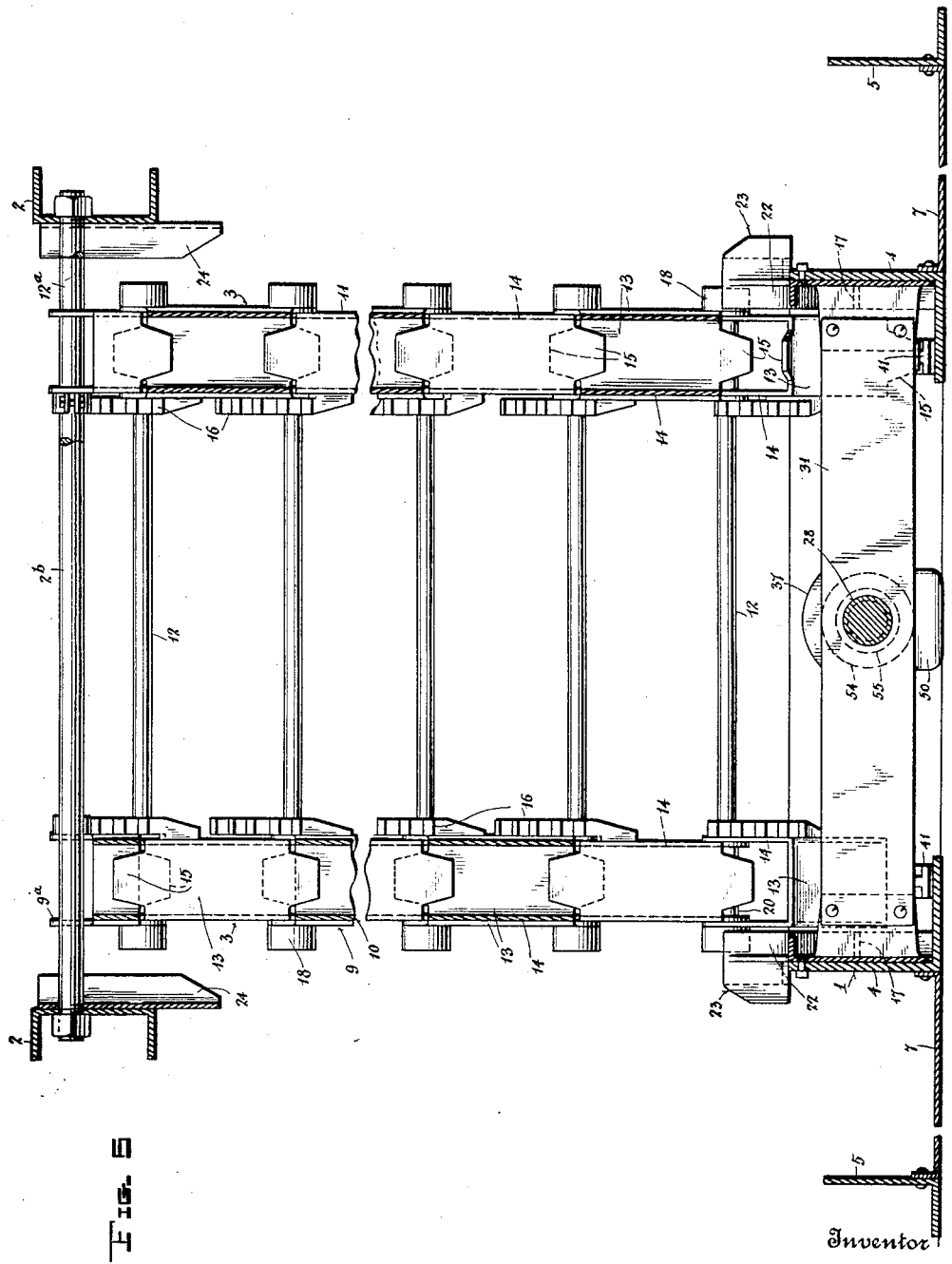
Fig. 5
Inventor
Ernest W. Holmes
By
Attorney Dec. 1, 1931.  E. W. HOLMES  1,834,900
AUTOMOBILE LIFT
Filed Oct. 7, 1927  8 Sheets-Sheet 6
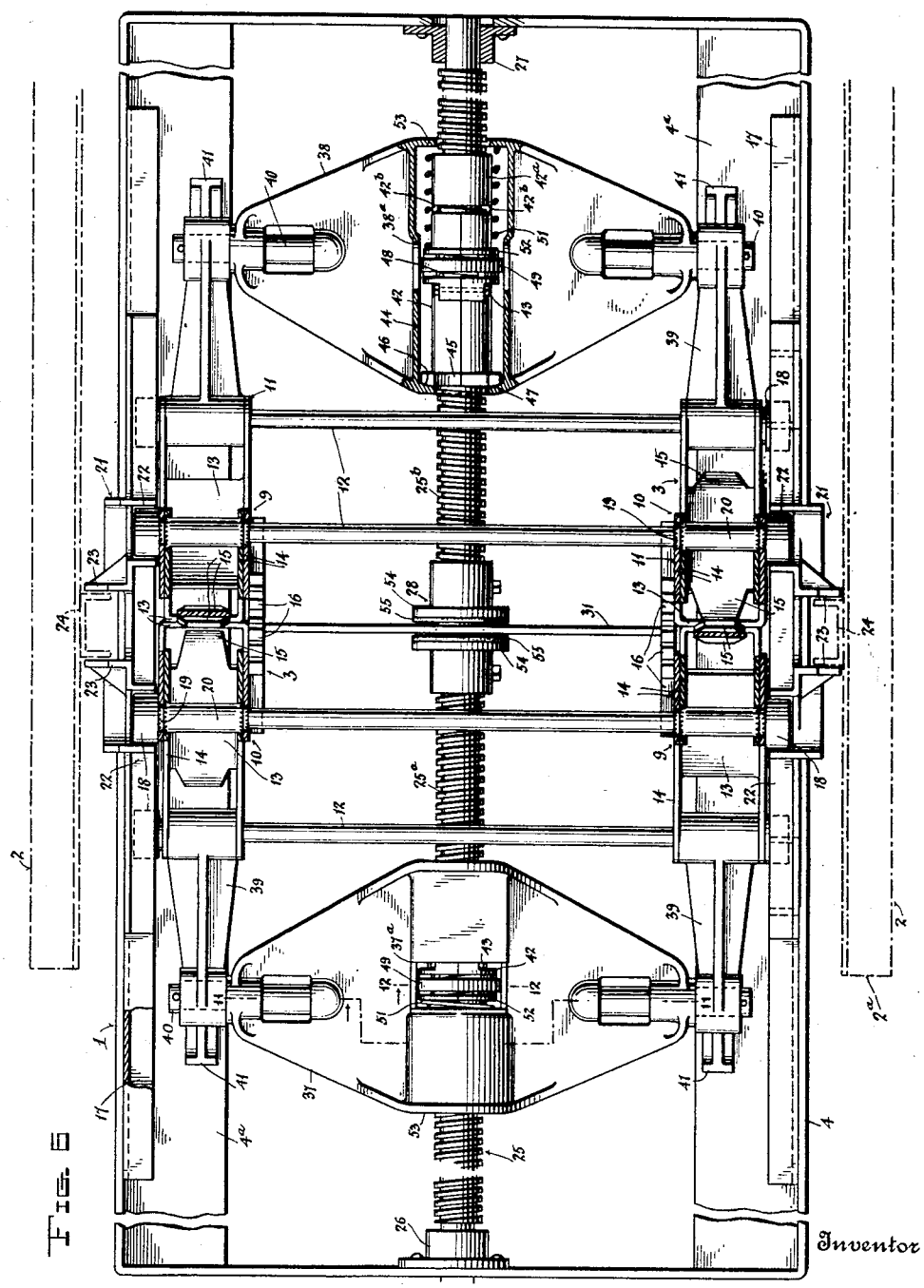
Fig. 5
Inventor
Ernest W. Holmes,
By 
Attorney Dec. 1, 1931.  E. W. HOLMES  1,834,900
AUTOMOBILE LIFT
Filed Oct. 7, 1927  8 Sheets-Sheet 7
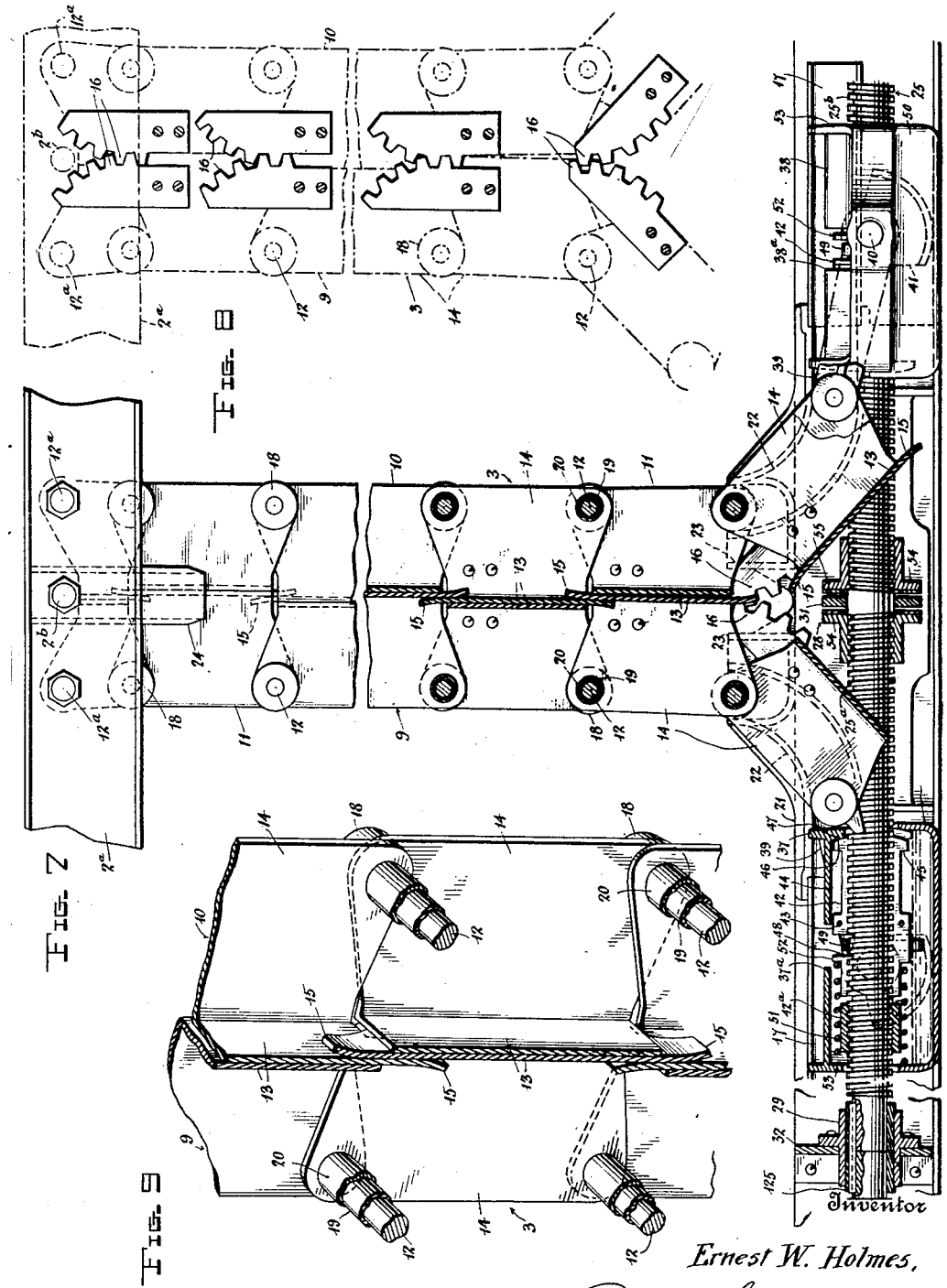
Inventor
Ernest W. Holmes,
By
Attorney

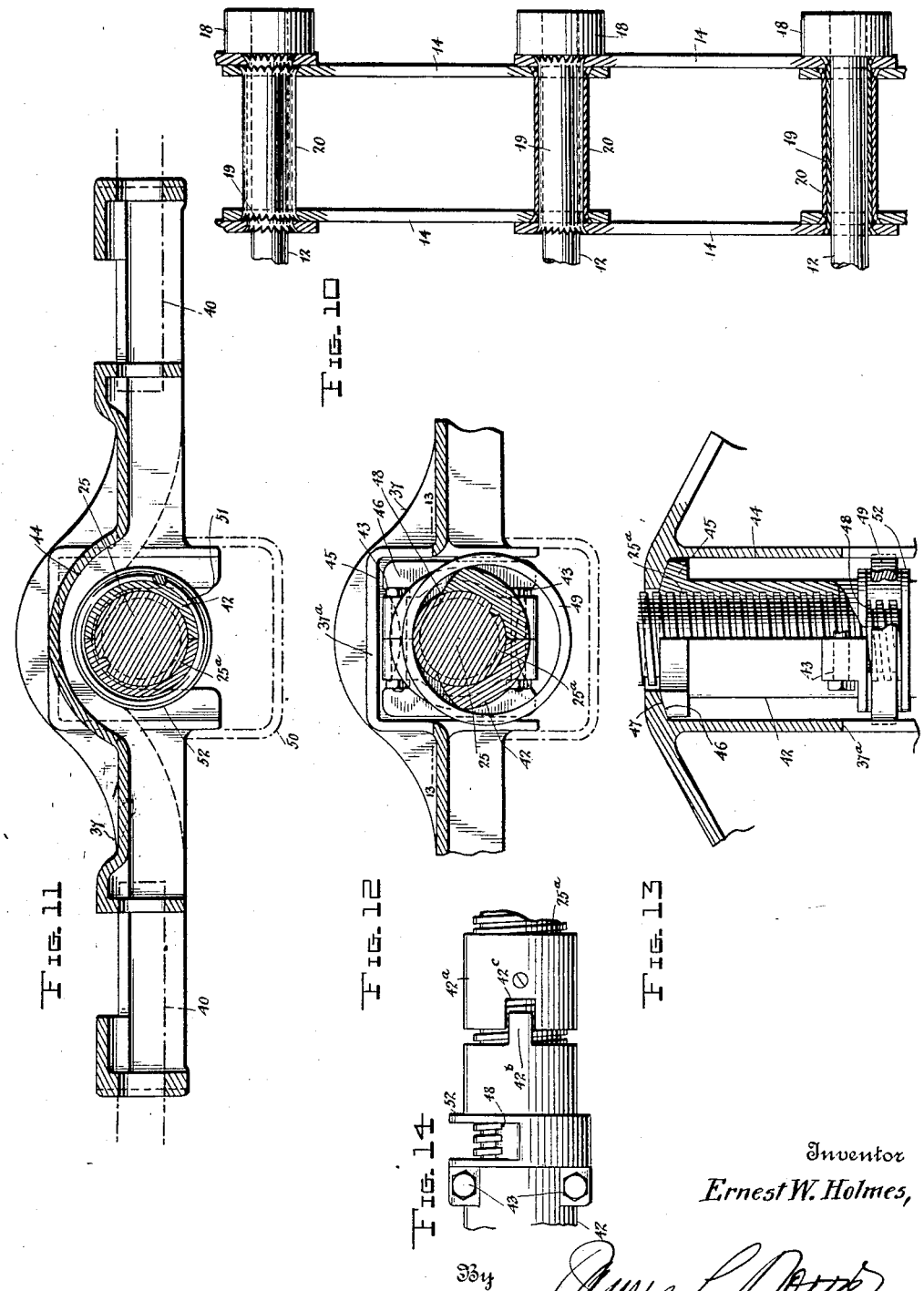

Patented Dec. 1, 1931

1,834,900

UNITED STATES PATENT OFFICE

ERNEST W. HOLMES, OF CHATTANOOGA, TENNESSEE, ASSIGNOR TO ERNEST HOLMES COMPANY, OF CHATTANOOGA, TENNESSEE, A CORPORATION OF TENNESSEE

AUTOMOBILE LIFT

Application filed October 7, 1927. Serial No. 224,657.

The present invention relates to auto lifts and more especially to those of the class adapted to lift an automobile or similar vehicle bodily whereby the parts or mechanisms thereof and particularly the running gear and the mechanisms at its under side are rendered conveniently accessible for inspection, lubrication, adjustment or repair.

The present invention provides a novel and improved auto lift of this class whereby all of the operative parts or mechanisms thereof are accommodated within the road clearance of any conventional type of automobile, so that it will offer no obstruction to the placing of an automobile above it to be lifted or to the removal of an automobile therefrom after it has been lowered, and the lift, when raised, is capable of elevating an automobile to a sufficient height above the floor to enable workmen to walk or stand beneath it, as well as of elevating an automobile to any desired intermediate height, and these results are accomplished without the necessity of providing a pit or depression in the floor on which the lift rests.

The construction of the lift is such that it possesses ample strength, rigidity and stability to insure safety to the workmen and the automobile when the latter is elevated.

More particularly, the auto lift, according to the present invention, embodies a pair of masts or columns which carry a frame and operate to raise and lower it, each mast or column comprising a pair of half columns or column sections each composed of a series of hinged blocks or links, the blocks comprising each column section lying horizontally and being accommodated compactly in the base of the lift while the frame is lowered and extending in upright position from the base and in parallelism while the frame is raised, the blocks of each pair of column sections being provided with means operative automatically, as the blocks move into upright parallel position, to lock the two column sections firmly and rigidly together to form a substantially solid and rigid mast which will insure great strength and stability of the structure when elevated, and the blocks composing the column sections are so guided, controlled and operated, during raising and lowering of the frame, as to insure positive locking and unlocking of the blocks of the adjacent column sections and steady raising and lowering motion of the frame and its load.

To these and other ends, the invention consists in certain improvements and combinations and arrangements of parts all as will be hereinafter more fully described, the features of novelty being pointed out particularly in the claims at the end of the specification.

In the accompanying drawings:—

Figures 1 and 1ª show collectively in side elevation an auto lift constructed in accordance with the preferred embodiment of the invention;

Figures 2 and 2ª show collectively in top plan the auto lift shown in Figures 1 and 1ª;

Figure 3 is a side elevation on an enlarged scale, with portions thereof in section, the column sections which form the lifting mast at one end of the lift, and the operating mechanism for the column sections, the latter being shown elevated in this figure;

Figure 4 is a vertical section taken longitudinally through the opposite end of the lift and showing the column sections at that end of the lift in lowered position;

Figure 5 represents on an enlarged scale, a section taken vertically through the lift, showing one of the masts partly broken away and in elevated position;

Figure 6 represents a section taken horizontally through one of the masts, illustrating one end of the base and the operating and guiding means for the column sections which form one of the masts;

Figure 7 is a view partly in elevation and partly in vertical section, illustrating the interlocking means between the blocks of the component column sections and the mechanism for raising and lowering the column sections;

Figure 8 is an elevation of a portion of one of the masts, showing the gearing between the blocks of the component column sections for controlling the pivoting movements of the blocks and for locking the column sections against side slip when elevated;

Figure 9 is a perspective view representing a section taken vertically through the adjacent blocks of the component column sections of one of the masts, illustrating in detail the inter-lock between the blocks of the adjacent column sections;

Figure 10 represents a section taken in the plane of the pivots or hinges which connect the adjacent blocks of one of the column sections, this figure illustrating in detail the construction of the pivots or hinges;

Figure 11 represents on an enlarged scale a section through the yoke which comprises part of the operating mechanism for one of the column sections, the section being taken on the line 11—11 of Figure 6;

Figure 12 represents on an enlarged scale a section taken on the line 12—12 of Figure 6;

Figure 13 represents a horizontal section taken on the line 13—13 of Figure 12; and Figure 14 is a detail view, showing a portion of the actuating screw, and one of the actuating nuts and its cooperative safety nut.

Similar parts are designated by the same reference characters in the several views.

The present invention is applicable to auto lifts and other appliances adapted for use in the lifting and elevating of automobiles and other vehicles and objects, it being more particularly applicable however to auto lifts of the class adapted to lift automobiles bodily to a height which enables them to be inspected, lubricated, adjusted or repaired, thus obviating the necessity of using a pit as has been previously required for these purposes, and thereby avoiding the disadvantages of a pit. The preferred embodiment of the invention is shown in the accompanying drawings and will be hereinafter described in detail but it is to be understood that the invention is not restricted to the precise construction shown as equivalent constructions are contemplated and such will be included within the scope of the claims.

The auto lift shown in the present instance comprises generally a base 1, which is constructed to rest flatwise on the surface of a concrete or other floor, a frame 2 which is adapted to receive the automobile or other vehicle thereon, and a pair of masts 3 the components of which are contained within the base when lowered and are extended upwardly from the base to form the masts and to elevate the frame carried by the upper ends of the masts.

The base 1 is of a length which is preferably greater than that of an automobile, and it comprises a central or body portion 4 which is adapted to house the column sections which form the masts, when the latter are lowered, and also the guiding and operating means for the column sections, and at opposite sides of the central or body portion of the base are secured guard rails 5 which may be composed of angle irons having upturned flanges, these guard rails being spaced apart a distance substantially equal to the inside tread width of the wheels of an automobile, these guard rails serving to center an automobile transversely with respect to the central or body portion 4 of the base, when an automobile is rolled or driven into position above the base. In order to facilitate the placing of an automobile into position above the base, the entrance ends of the guard rails preferably converge as at 6. These ends of the guard rails may be fixed to the sides of the body portion 4 of the base, these convergent portions of the guard rails serving to direct or steer the wheels of an automobile so that the latter will assume a transversely centralized position as it is rolled or driven into position above the base. The other portions of the guard rails are preferably parallel and are secured rigidly to the respective sides of the central portion 4 of the base by spacing members 7. The rigid mounting of the guard rails at opposite sides of the central or body portion 4 of the base increases the effective width of the base resting on the floor, thereby increasing the lateral stability of the lift when the latter is raised and supports an automobile in elevated position thereon.

In order to facilitate the placing of an automobile longitudinally of the lift, chocks 8, preferably in the form of reversely inclined plates, are suitably fixed to the outer sides of the parallel portions of the guard rails so that the front wheels of an automobile may ride over these chocks and the rear wheels of the automobile may come to rest against them, the movement of the automobile into position above the base being thus arrested at the proper point to insure proper engagement of the frame 2 with the under side of the running gear of the automobile.

The masts 3, a pair of which is employed, are housed within the respective ends of the base when the frame 2 is in lowered position, the frame 2 then occupying a position at or near the level of the top of the base so that it offers no obstruction to the placing of an automobile above the base or its removal therefrom, and the masts are so constructed and operative that they rise perpendicularly from the respective ends of the base, and in so doing they elevate the frame 2 and the automobile placed in position above it while the frame is in its lowered position. The masts at the respective ends of the lift are of substantially duplicate construction, so that a detailed description of one of the masts will suffice for both. Each mast comprises a pair of half columns or column sections 9 and 10, and each column section comprises a series of blocks or links 11 which are hinged together or pivotally connected by pivots 12 so that each column is capable of flexing about the pivots 12 as axes. The pivots 12 of the column sections are so arranged that they will occupy positions at the outer or remote sides of the mast when the column sections are extended, and when the column sections are lowered and housed within the base, these pivots will be arranged along the upper edges of the column sections so that the column sections may diverge horizontally at the base of the mast and may be moved in opposite directions in the base during lowering of the mast and housing of the column sections in the base. The blocks or links composing each column section are preferably formed of sheet or plate metal of appropriate thickness and strength bent in to channel or U form so that each block or link will comprise an intermediate wall 13 and parallel side walls 14, the intermediate walls of the blocks or links of the column sections, when the latter are extended to form the mast, abutting flatwise and solidly against one another, and the side walls 14 receiving the pivots 12. Preferably the blocks or links are of two different widths, the blocks or links of different widths alternating in the length of each column section so that the side walls 14 of the wider blocks or links will overlap the outer sides of the side walls of the narrower blocks, and the pivots 12 extend through these overlapping portions of the blocks, and the wider blocks are also preferably deeper than the narrower blocks so that the deeper block of one column section will come opposite to a shallower block of the cooperating column section, the deeper blocks being staggered in the two column sections.

Means is provided for positively and rigidly interlocking the blocks or links composing the column sections when the latter are raised or extended to form the mast, whereby a mast which is substantially solid and free of lost motion or shake will be produced. Preferably and as shown in the present instance, the alternating narrower and deeper block or link of each column section is formed with tongues 15 which are continuations of the upper and lower ends of its intermediate wall 13, and the blocks or links formed with these tongues in one column section are opposite to the shallower blocks or links of the other column section which are without such tongues. The tongues on the blocks or links in the two column sections which cooperate are bent or inclined relatively to the wall 13 to insure the proper lapping of these tongues as the blocks swing into position to form the mast and to cause close contact of the tongues. This formation and arrangement of the tongues enables the tongues on the blocks or links of the two column sections to move or slide into and out of overlapping relationship during the relative pivoting movements of the blocks composing the column sections, which takes place at the base of the mast during raising and lowering thereof, but when the column sections are raised, the tongues carried by the blocks or links of the two column sections move into overlapping relationship and they act to draw the two column sections toward one another and to positively and immovably lock them together to form in effect a rigid solid mast wherein relative motion between the columns or the blocks or links composing them is precluded. The locking tongues not only overlap one another but the overlapping tongues of the blocks or links of the two column sections lie between the intermediate walls 13 of the adjacent blocks or links which are without tongues, so that the intermediate wall 13 of each block or link provided with the locking tongues is firmly bound and locked between the intermediate walls 13 of the blocks or links which are without tongues, the resulting confinement of the blocks having the tongues assisting in locking together the column sections so that relative lateral displacement thereof or lost motion between the blocks or links composing the column sections cannot take place. The overlapping relationship of the ends of adjacent links precludes interference with the pivoting movements of the links during erection thereof in alinement, as the overlapped ends of the links will shear any foreign matter or objects that might lodge between them, and such interference is further avoided by the gaps between the ends of the links, as shown.

In order to properly control the pivoting movements of the blocks or links of the column sections while the latter are being raised and lowered and to further increase the rigidity and stability of the mast formed by the column sections when raised or extended, the directly opposite blocks or links of the column sections are provided with gear segments 16 which are bolted or otherwise fixed to the sides thereof so that these gear segments mesh in pairs, the gear segments being concentric with the respective pivots 12 about which the blocks or links to which they are fixed swing. The meshing of the gear segments of the directly opposite blocks or links of the column sections, while the latter are raised or extended lock the column sections against relative longitudinal displacement, and the gear segments of the two column sections cooperating in the region where the column sections change their direction of motion from horizontal to vertical during raising thereof or from vertical to horizontal during lowering thereof, insure equal swing of the blocks or links of the two columns about their pivots, thereby providing a firm support for the mast at its base which will effectively resist forces tending to tip the mast in a direction longitudinally of the base. The gear segments on the blocks or links of the column sections also serve to insure proper assembling of the column sections while they are being elevated to form the mast. The blocks or links composing the column sections are guided during their travel horizontally within the base by rails 17 which are preferably composed of channel irons which are bolted or otherwise secured to the inner sides of the longitudinal members comprising the body portion 4, the pivots 12 joining the blocks or links of each column section having rollers 18 fixed on their ends and being of a diameter to travel between the upper and lower inwardly directed flanges of these channel irons. The pivots 12 are preferably fitted revolubly in sleeves 19 which are expanded or otherwise fixed in the side walls 14 of the wider blocks or links, and the sleeves 19 are rotatably fitted in sleeves 20 the ends of which are expanded or otherwise fixed in the side walls 14 of the narrower blocks or links as is shown in Fig. 10. Each column section of each mast preferably comprises two series of pivotally connected blocks or links, as will be clear from Figure 5, the two series of blocks or links composing each column section being connected by the pivots 12. Each column section thus constituted is received when lowered between the longitudinal side members of the body 4 of the base and the rollers 18 on the ends of the pivots 12 will engage in the tracks or rails 17 and thereby support the column sections at a given horizontal level while they are travelling longitudinally within the base, incident to the raising and lowering of the mast.

In order to guide the blocks or links of the column sections while they are passing out of or entering the base and to provide a firm support for the mast formed by the raised column sections, a bracket 21 is bolted or otherwise fixed on each longitudinal side member of the body portion 4 of the base, these brackets being of duplicate construction. Each bracket has a pair of curved tracks or channels 22 which are continuations of the horizontal tracks or channels 17 so that these curved tracks or channels will receive the rollers on the pivots of the respective column sections, and will cause the blocks or links composing them to swing upwardly and assemble properly to form the mast while the column sections are being forced from the base, and these curved tracks or channels will cause the blocks or links to diverge into opposite horizontal paths so that the column sections will be properly returned to the base during lowering of the mast. The oppositely curved tracks or channels 22 of these brackets preferably extend sufficiently high to engage the rollers 18 on the pivots of the lowermost blocks or links when the mast is extended to its maximum height, the supports thus afforded the base of the mast preventing rocking or tilting motion of the mast in a direction longitudinally of the base.

The frame 2 is connected to the tops of the masts by the pivots $12^a$ which are carried by the uppermost links, this frame preferably comprising a pair of longitudinal members $2^a$ which are spaced apart a distance greater than the width of the central or body portion 4 of the base so that when the frame is in its fully lowered position, its longitudinal side members will extend partially below the top of the base, thus providing ample clearance above the lift to avoid interference between the frame 2 and any part of the automobile while the latter is being brought into or removed from a position above the lift. The longitudinal members $2^a$ of the frame 2, when the latter is lifted, are adapted to engage the under side of the front axle of the automobile, and the opposite end of the frame 2 is preferably adapted to engage the under side of the differential housing of the rear axle of the automobile, for which purpose cross bars $2^b$ are extended across the width of the frame 2 in addition to the pivots $12^a$ to provide a grid or platform, as is shown in Figure 2 on which the differential housing may rest.

The construction and mode of operation of the column sections comprising the masts 3 at both ends of the lift are substantially the same, but in order to eliminate end shake of the frame 2, due to tipping of the upper ends of the masts in a direction longitudinally of the base while the column sections are being forced out of the base, due to the simultaneous passing of the rollers 18 from the brackets 21 at the bases of both masts, it is preferable to provide half length blocks or links $9^a$ and $10^a$ at the upper end of one of the masts and similar half length blocks or links at the lower end of the other mast, as will be understood from a comparison of Figures 1 and $1^a$, this alternating arrangement of half length blocks or links causing the rollers 18 on the column sections of the different masts to disengage from the brackets 21 alternately or at different times so that while the rollers 18 of one mast are disengaged from the respective brackets 21, the rollers of the other mast will be in engagement with their brackets and will act to steady or prevent endwise displacement of the frame 2.

In order to guide the frame 2 during its initial rising and final descending movement, each bracket 21 is preferably provided with a pair of spaced vertical flanges 23, and the frame 2 is provided with a set of tongues 24, one of which is movable vertically between the flanges 23 on each bracket, the frame 2 being thereby guided to move vertically during its initial upward movement from the base and its final descending movement which brings it to rest on the base.

The column sections are simultaneously operated to raise and lower both ends of the frame 2 by appropriate mechanism contained in the base. Preferably a screw 25 which is composed of two sections keyed or splined at their inner ends within a sleeve 125 so that the shaft sections will revolve in unison but will be capable of independent endwise movement in either direction, is employed for this purpose, the outer ends of the screw sections being journalled in bearings 26 and 27 mounted in the ends of the body portion 4 of the base and the intermediate portion thereof being supported by additional bearings 28 and 30 which are fixed in rigid cross members 31, 33 which connect and are secured to the longitudinal side members of the body portion 4, the sleeve 125 coupling the inner ends of the screw sections being journaled in a central bearing 29 supported by a rigid cross member 32. The screw may be revolved in one direction to raise the frame 2 and in an opposite direction to lower said frame by an electric motor 34 which is provided with suitable switch means for operating it reversibly, the motor shaft being connected to the screw 25 by suitable reduction gearing 35 which is connected to a gear 36 fixed on one end of the screw.

The screw section at each side of the central cross member 32, is formed with right and left hand threaded portions 25$^a$ and 25$^b$, these threaded portions occupying positions at opposite sides of the respective cross members 31 and 33, these cross members being located substantially in the central vertical planes of the respective masts.

The right and left hand portions of the screw sections are utilized to operate the respective pairs of column sections 9 and 10 so that both masts 3 will be raised and lowered simultaneously and evenly. For this purpose the column sections 9 and 10 of each mast are connected respectively to a pair of yokes 37 and 38, through the medium of links 39 which are pivotally connected to the lowermost pivots 12 of the bottom links and stub shafts 40 which are fixed to and project in alinement from opposite ends of the respective yokes. The links 39 are provided with segments 41 which are concentric with the axes of the respective shafts 40, and these segments are arranged to travel along and to bear or rest on inturned horizontal flanges 4$^a$ which extend inwardly from the lower edges of the longitudinal members of the body 4 of the base.

The yokes 37 and 38 are arranged to travel simultaneously but in opposite directions longitudinally within the base, under the action of the right and left hand screw sections 25$^a$ and 25$^b$ respectively. Each yoke is operatively connected to its respective screw section by a nut or sleeve 42 which is internally threaded to conform with the respective screw section and is preferably split diametrically to facilitate its mounting on and removal from the screw, the split sections or halves of the nut being clamped together solidly on the screw by bolts 43. The nut or sleeve is housed within a chamber 44 which is formed in the central portion of the respective yoke, and one end of the nut or sleeve is formed with a flange 45 the end surface 46 of which is preferably approximately spherical, this end surface bearing against a seat 47 which is formed in the yoke at the end of the chamber 44 which is toward the respective mast, the flange 45 and seat 47 sustaining the thrust transmitted between the screw and the respective column section due to the weight of and the load on the latter, the spherical bearing between the nut and its respective yoke allowing equalizing motion of the yoke without causing binding of the nut on the screw. The chamber 44 in the yoke which contains the nut or threaded sleeve and the periphery of the flange 45 are rectangular or otherwise angular in cross section, as is shown in Figure 12 whereby rotation of the nut within the yoke is prevented. Means is preferably provided for supplying oil or other lubricant to the screw to reduce friction and wear between the screw and nut. Preferably, the upper portion of the nut or sleeve is formed with a transverse recess 48 which exposes the upper side of the screw, and an oil ring 49 is mounted in this recess so that it will ride on the screw as the latter revolves. An oil pan or receptacle 50 is attached to the under side of the yoke beneath the chamber 44 therein, this oil pan containing a bath of oil, and the oil ring 49 dips into the oil and the rotation of the oil ring incident to the revolving motion of the screw carries oil to the screw. The transverse recess in the nut also exposes the threads in the nut so that the extent of wear of these threads may be readily determined by inspection, the yokes having openings 37$^a$ and 38$^a$ above the recesses in the respective nuts so that the condition of the nuts may be determined without the necessity of removing them from the yokes.

Preferably each nut or threaded sleeve is capable of limited axial movement within the chamber 44 of its yoke in a direction to carry the abutment flange 45 of the nut out of engagement with the seat 47 of the yoke, the purpose of this movement being to compensate for over motion of the screw, due to the momentum of the electric motor after the column sections have reached their fully lowered positions and the electric current operating the motor has been cut off. Such motion of the nut or sleeve however is preferably opposed or resisted by a compression spring 51 which is interposed between a flange 52 on the nut and the rear wall 53 of the yoke, this spring always acting in a direction to move the nut or sleeve in a direction to maintain the abutment flange 45 thereof in engagement with the seat 47 of the yoke. The yokes 37 and 38 connected to the column sections 9 and 10 of each mast and the nuts or sleeves therein are of duplicate construction, although the yokes are in relatively reversed position as will be clear from Figure 6, and the nuts or sleeves are provided respectively with right and left hand threads to conform with the right and left hand threaded sections 25$^a$ and 25$^b$ of the screw. By providing the column sections 9 and 10 of each mast with the yokes 37 and 38 and connecting these yokes to right and left hand threaded sections on the screw, rotation of the screw in one direction will cause the yokes to travel longitudinally within the base in a direction toward one another and the yokes will thus act to force the column sections toward one another and then upwardly during which operation, and the blocks or links of the column sections will interlock as they are assembled to form the respective upright mast.

During the travel of the column forming links longitudinally within the base they are supported by the tracks or rails 17 along which the rollers 18 travel, and as the column sections approach their fully extended raised positions, at which time the yokes 37 and 38 are in close proximity to one another, the links 39 which connect them to the respective column sections deflect upwardly at relatively sharp angles to the axis of the screw, the segments 41 on the links 39 bear or rest on the inturned flanges 4$^a$ of the base and thereby relieve the screw of the weight of the column sections and load thereon which would otherwise be imposed upon it. When the screw is revolved in an opposite direction, the yokes are shifted longitudinally of the base in a direction away from one another, and the column sections are thereby lowered and withdrawn into the base, the links thereof being supported during their travel within the base by the rails 17 which receive the rollers 18. The end thrust exerted on the screw by one yoke will be equal and opposite to that exerted on the screw by the other yoke of the same pair, so that the screw is not required to sustain any resultant end thrust of the column sections constituting the mast and the weight imposed thereon.

A safety device is preferably provided for sustaining the load on either of the column sections of each mast in the event the threads of the nut which raises and lowers it strip, and cooperative means is preferably provided for automatically stopping the elevating operation should a nut strip while such operation is taking place although allowing the masts to be lowered so that an automobile supported by the lift may be removed therefrom. Preferably, an auxiliary or safety nut 42$^a$, composed of steel or other strong metal, is threaded on the screw 25 behind each nut 42, it being normally spaced axially from the rear end of the respective screw for a distance, for example, of one thread, and the auxiliary nut is held non-rotatably while the screw revolves idly within it, by lugs 42$^b$ which project rearwardly from the nut 42 and engage in recesses 42$^c$ in the adjacent end of the auxiliary nut, or by any equivalent means whereby the auxiliary nut will be normally spaced axially in rear of the nut 42 and the screw will revolve freely within it, but should the thread in the nut 42 strip, the consequent displacement of this nut along the screw, due to the load thereon, will bring its rear end against the forward end of the auxiliary nut, and the latter will then sustain the thrust of the nut 42 under the load thereon, and the respective column section will then be supported by the auxiliary nut. While the lost motion between the nut 42 and the auxiliary nut 42$^a$ is being taken up, the respective screw section shifts axially in its bearings to re-establish a balance between the thrusts applied by the respective column sections on this screw section, and this axial shift of the screw section is utilized to automatically stop the elevating operation, should one of the nuts thereon strip while such operation is taking place, although allowing the screw to be revolved in a reverse direction to lower the lift. For example, each screw section has a pair of brake or clutch members 54 fixed thereon at opposite sides of the respective bearing 28 or 30, these members having brake or clutch faces 55 which are normally spaced slightly from the respective sides of the bearing and serve to prevent axial displacement of the shaft section, but axial shift of the respective shaft section, consequent upon stripping of a nut thereon, will bring one of these brake or clutch faces against the bearing and cause it to act frictionally or otherwise to resist rotation of the screw in a direction to elevate the lift, such resistance alone or in conjunction with the load on the lift imposing such an abnormal load on the motor which operates the screw as to bring about stalling or stoppage of the motor. However, the lift may be lowered to permit removal of the automobile therefrom, by reversing the rotation of the screw, the faces 55 being of a nature to permit such operation, friction faces, for example, allowing the motor to rotate the screw in a direction to lower the lift, as the weight of an automobile will assist the motor to overcome the frictional resistance between such face and the bearing.

The operation of an auto lift constructed as hereinbefore described is briefly as follows:—

While the column sections are withdrawn within the base, at which time the yokes 37 and 38 will occupy their position of maximum separation as is shown in Fig. 4 and the frame 2 is in its lowermost position at a level slightly above the top of the base, the automobile to be elevated is driven or rolled longitudinally over the base until the differential housing of its rear axle is directly above the grid or platform formed by the rod 2$^b$ and 12$^a$, the front axle of the automobile at this time extending crosswise above the opposite end of the frame 2. The chock 8 will serve to assist in bringing the automobile into this position. While the automobile occupies such position, the electric motor 34 is operated to revolve the screw 25 in a direction which will cause it to simultaneously shift the column sections 9 and 10 of both masts in a direction longitudinally of the frame, the column sections of each pair moving toward one another and then moving upwardly under the cam action of the curved tracks in the brackets 21, and while the direction of movement of the column sections is changing from the horizontal to the vertical, the blocks or links composing the sections, become automatically interlocked in the manner hereinbefore described. The ascending column sections travel vertically in parallelism and their upward motion may be continued until the masts supporting the ends of the frame 2 have been extended to their maximum height. The initial operation of the column sections as they are forced out of the base raises the frame 2 until it comes into engagement with the front axle and differential housing of the automobile positioned above it, and the continued rise of the frame 2 under the action of the column sections causes it to lift the automobile bodily from the floor. If the column sections are extended fully, the automobile will be lifted to a height above the floor which will enable workmen to walk or stand beneath the automobile and may thus inspect, lubricate, adjust or repair it with facility. In some cases it may be desirable to elevate the automobile to a less height, and it will be understood that the raising operation may be interrupted by stopping the electric motor as soon as the automobile reaches the height desired. The automobile is lowered by simply operating the electric motor in an opposite direction, the screw then acting to lower the column sections and to draw them within the base, the current supplied to the motor being interrupted as soon as the column sections have been fully lowered and drawn into the base. The frame 2 is then brought into its lowermost position in close proximity to the top of the base, and the automobile may be driven or rolled from position above the lift.

The present invention enables an auto lift to be provided which is of minimum height above the floor so that an automobile may be placed in position above it to be elevated and removed therefrom, without obstruction. The lift may be placed on an ordinary floor without the necessity of providing a pit or other depression, the extent of lift afforded enabling the automobile to be elevated above the floor level to a height which will enable workmen to obtain easy access to all parts of the automobile exposed at its under side, and the base of the lift is sufficiently wide to afford ample lateral stability thereof while it supports an automobile in elevated position.

The interlocking of the column sections constituting each mast insures great strength, rigidity and solidity of the masts so that they will be stable and free from shake or vibration while elevated, and the means provided for guiding the blocks or links of the column sections during raising and lowering thereof insures an even and steady rising and lowering movement of the frame and an automobile resting thereon.

While the uppermost links of the masts, which are pivotally connected to the lifting frame as described, are preferably used without gear segments such as those which connect the other pairs of links of the masts and assist in rendering them rigid when erected, these uppermost links will be effectively locked so that pivotal movements cannot take place between them and the lifting frame while these uppermost links are in upright or erected position, since they will be firmly drawn together and rigidly locked against pivotal movements relatively to one another and to the lifting frame by the respective next lower pairs of links as the latter move into interlocked relationship incident to the erection of the masts, and hence endwise displacement of the lifting frame will be prevented by the rigid or non-pivotal connections thus established between the frame and the upper ends of the masts, and this rigid relationship between the frame and the upper ends of the masts will assist the means supporting the lower ends of the masts in maintaining the stability thereof when partially or wholly erected.

All of the operative parts of the lift are housed within the base while the lift is in its normal lowered condition, and the lifting frame then occupies a position about level with the top of the base, the entire lift being self-contained. It is therefore portable and capable of being shipped with facility, and when placed on a floor it is ready for use, no special installation being required.

It is to be understood that while the invention is herein shown and described as applied to an auto lift of the type adapted to raise an automobile or the like bodily, the invention, in whole or in part, may be applied to lifting and similar devices of other types, and such applications of the invention will be included, within the scope of the claims.

I claim as my invention:—

1. A lifting device comprising column sections each composed of a series of links of channel form pivotally connected at the ends of their side walls and having flat intermediate walls, means for bringing said sections into parallel abutting relationship with the flat intermediate walls of the links thereof in flatwise engagement to form a mast, and tongues projecting from the ends of the flat intermediate walls of certain of the links of said sections, said tongues cooperating to lock the column sections in abutting relationship.

2. A lifting device comprising column sections each composed of a series of pivotally connected links, means for bringing said sections into parallel mutually supporting relationship to form a mast, and means connecting the corresponding links of said sections for equalizing the pivoting movements thereof.

3. A lifting device comprising column sections each composed of a series of pivotally connected links, means for bringing said sections into parallel relationship to form a mast and means connecting opposite links of the column sections for equalizing the pivoting movements thereof.

4. A lifting device comprising column sections each composed of a series of pivotally connected links, means for bringing said sections into parallel abutting relationship to form a mast, means connecting the corresponding links of said sections for equalizing the pivoting movements thereof, and means on certain links of said sections movable during the relative pivoting movements thereof into cooperation to lock the column sections in abutting relationship.

5. A lifting device comprising a pair of column sections each composed of a series of pivotally connected links, means for bringing said sections into parallel relationship with the ends of the adjacent links of each section in longitudinally spaced relation to form a mast, and means connecting the corresponding links of said sections to equalize the pivoting movements thereof and to lock them against relative displacement while they are in parallel relationship.

6. A lifting device comprising a pair of column sections each composed of a series of pivotally connected links, means for bringing said sections into parallel relationship to form a mast, and means connecting opposed links of said sections to lock them against relative longitudinal displacement while they are in parallel relationship and to equalize concurrent pivoting movements of said opposed links while they are being brought into such relationship.

7. A lifting device comprising a pair of column sections each composed of a series of pivotally connected links, means for bringing said sections into parallel abutting relationship to form a mast, and pairs of intermeshing gear means carried by the corresponding links of said sections coaxially of the pivots thereof.

8. A lifting device comprising a base, a pair of column sections each composed of a series of pivotally connected links, means in the base for guiding said sections for movement longitudinally in opposite directions therein, an actuating member extending longitudinally in the base and connected to the ends of the column sections, said member being operative to force the column sections simultaneously but in opposite directions longitudinally in the base, and means for guiding said sections to move upwardly from the base into parallel abutting relationship to form an upright mast.

9. A lifting device comprising a base, a pair of column sections each composed of a series of pivotally connected links, means for guiding said sections to move longitudinally in opposite directions in the base, means for directing said sections upwardly from the base and into parallel relationship to form a mast, and an actuating screw mounted in the base and operatively connected to the ends of the column sections.

10. A lifting device comprising a base, a pair of column sections each composed of a series of pivotally connected links, means in the base for guiding the lower ends of said sections to move longitudinally in opposite directions therein and for directing said sections to move upwardly from the base into parallel relationship to form an upright mast, and a screw revolubly mounted in the base and having threads of opposite pitch thereon cooperative with the ends of the respective column section.

11. A lifting device comprising a base, a pair of column sections each composed of a pair of laterally-spaced series of pivotally connected links, means in the base for guiding said sections to move longitudinally therein, means for directing said sections upwardly from the base into parallel upright relationship to form a mast, yokes connected to the lower ends of the respective pairs of series of links of the column sections, and a screw mounted in the base and having portions thereof operative on the respective yokes whereby rotation of said screw will cause the column sections to move simultaneously but in opposite directions.

12. A lifting device comprising a base, a pair of column sections each composed of a series of pivotally connected elements, rails extending longitudinally within the base and cooperative with the column sections for supporting and guiding them, means connecting the lower ends of the column sections for forcing said column sections longitudinally of the base and in directions toward one another, and cam means arranged to receive the elements of the column sections from said rails and operative to direct said elements upwardly into parallel upright relationship.

13. A lifting device comprising a pair of column sections each composed of a pair of series of pivotally connected links, means for directing said sections into parallel upright relationship, a yoke connected to the lower ends of the pair of series of links composing each column section, and means connecting the yokes for actuating the yokes in relatively opposite directions.

14. A lifting device comprising a pair of endwise movable members each composed of a series of pivotally connected elements, means for directing said members from substantially horizontal into upright position, a screw, and means operatively connecting said screw to the respective members whereby rotation of the screw will move said members in an endwise direction to raise or lower them and the screw will sustain said members substantially without end thrust.

15. A lifting device comprising a pair of column sections each composed of a series of pivotally connected elements, means for directing said sections into upright relationship, a yoke connected to the lower end of each column section, a nut mounted in each yoke and having a limited movement axially therein, and an actuating screw having threaded portions cooperative respectively with the nuts in said yokes.

16. A lifting device including a lifting element, a horizontal actuating screw therefor, a threaded nut engaging the screw for elevating the lifting element, said nut having a section of its upper side removed near its center exposing a section of the contained screw, and an oil ring engaging the section of the screw exposed by said removed section of the nut.

17. A lifting device comprising a pair of lifting members, a screw and cooperative nuts for actuating said members in unison, auxiliary nuts on the screw normally spaced axially from the first mentioned nuts but each adapted to be engaged by the respective first mentioned nut to sustain the load on the latter, and means operative by endwise movement of the screw consequent upon the movement of one of the first mentioned nuts into engagement with its respective auxiliary nut, for opposing operation of the screw to lift said members.

18. A lifting device comprising cooperative lifting members, a screw and cooperative nuts connected to said members for actuating them, auxiliary nuts on said screw behind and normally spaced axially from the respective nuts first mentioned but adapted to be engaged by the latter in consequence of endwise displacement thereof along the screw, a relatively fixed member, and stopping members fixed on the screw and normally inactive at opposite sides of said fixed member, one or the other of said stopping members being movable into cooperation with said fixed member by axial movement of the screw consequent upon the engagement of one of the first mentioned nuts with the respective auxiliary nut.

19. An automobile lift comprising a base, a pair of masts each embodying a pair of column sections, each column section being composed of a series of pivotally connected elements, means for supporting and guiding the lower ends of the column sections to move longitudinally in the base, brackets cooperative with the pivots of the column sections to direct the respective column sections upwardly from the base and into upright parallel relationship to form the masts when the column sections are moved endwise and means for actuating the column sections, the pivots connecting the elements composing one pair of column sections being staggered longitudinally thereof relatively to the pivots of the other column sections whereby the pivots of the two pairs of column sections will alternately traverse their respective brackets.

20. A lifting device comprising a base, column sections each embodying a pair of series of pivotally connected elements, means in the base for supporting and guiding said sections to move endwise therein, a yoke connected to the ends of the series of elements constituting each column section, each yoke having a chamber therein and an abutment wall at an end thereof, a nut contained in the chamber of each yoke and abutting against said abutment wall, a screw having portions cooperative with the nuts in the yokes for moving the column sections endwise in opposite directions, and means for directing the column sections upwardly from the base into juxtaposition to form an upright mast.

21. A column member for a lifting device comprising a plurality of pivotally connected elements, the ends of adjacent elements being in non-abutting relation when said elements are in alignment and having portions thereof in lapped relation and engaged by the connecting pivots.

22. A lifting device comprising a pair of column sections having means for moving them simultaneously endwise and for guiding them into parallel abutting relationship to form a mast, each column section comprising a series of links each of channel form, the intermediate walls of the links of the columns abutting one another and the side walls of adjacent links in each column lapping, and pivots extending through the lapping portions of adjacent links.

23. A column section for a lifting device comprising a series of links each of channel form, adjacent links of the series being of different widths so that their side walls overlap, and sleeves connecting the side walls of the links, the sleeve of the narrower links fitting rotatably over the sleeves of the wider links.

24. An automobile lift comprising a base, an elongated lifting frame adapted to receive an automobile above it and to rise from the base, a pair of masts each composed of a pair of column sections embodying pivotally connected links and movable endwise upwardly from the base into parallel abutting relationship to lift said frame, the uppermost links of the column sections of the respective masts being pivotally connected to the frame at longitudinally spaced points toward its respective ends, and means operative to lock the uppermost links of the masts against pivotal movement relatively to said frame after said links have been brought into erect position.

In testimony whereof I have hereunto set my hand.

ERNEST W. HOLMES.